Patented Feb. 1, 1944

2,340,322

UNITED STATES PATENT OFFICE 2,340,322

COATING COMPOSITION

Thomas Raymond Griffith, Ottawa, Ontario, Canada

No Drawing. Application March 6, 1940,
Serial No. 322,576

24 Claims. (Cl. 260—768)

This invention relates to coating compositions, and in particular to coating compositions and a method for preparing coating compositions having a rubber derivative as a basic constituent of the composition.

Protective coatings have heretofore been prepared from various rubber derivatives, including rubber chloride and rubber isomers, such as are described in the Fisher U. S. Patent No. 1,605,180, Kirchoff Austrian Patent No. 90,775, Newbrough U. S. Patent No. 100,035, etc. Some of these compositions have a base which decomposes at temperatures as low as 100° C. and may also require coal tar solvents, which are much more hazardous and expensive than petroleum solvents. Others may have too high a viscosity for the quantity of base present, and the resistance of their films to chemicals, weather, abrasion, etc., may be too low.

It is an object of this invention to provide a method for preparing coating compositions and bases for coating compositions which have improved resistance to alkalies, acids and other chemicals, weathering and abrasion, and which are soluble in petroleum solvents, and which have a relatively low viscosity for relatively large amounts of the rubber derivative used as the base of the composition.

It is another object of this invention to provide rapid drying coating compositions which contain petroleum solvents, which do not skin in the can, and which may be baked to produce a coating having good gloss and hardness.

It is a further object to provide a base and a method for preparing a base for coating compositions, which base is readily soluble in rubber solvents and produces solutions having relatively low viscosity for relatively large amounts of the rubber derivative forming the base, thereby imparting body to the coating composition.

It is a still further object of this invention to provide a coating composition having high water resistance, gloss, smoothness, and which is suitable for coating concrete and metals.

Other objects will be apparent from the following description of the process and product.

The preferred bases for coating compositions are rubber conversion products having carbon and hydrogen in the same ratio as in rubber. They may be prepared by intimately mixing a suitable rubber conversion reagent, with or without rubber vulcanizing agents, etc., with rubber, heating the mixture in sheet form to produce a reaction, and masticating the product to render it soluble.

The properties of the rubber conversion product produced depend to a large extent on the reagent used in its formation, certain reagents giving products having considerably improved properties. Conversion reagents which in general have been found to give products with good properties may be mixtures of one or more salts of a strong acid in conjunction with a weakly acidic substance. It is thought that these conversion reagents have a polymerizing action on rubber under proper conditions and reduce the number of double bonds. The character of the product seems to be improved when both of the ingredients of the conversion reagent are solids, and is further improved when one or more of the solid substances contains considerable water of crystallization. The sulfates, and in particular the acid sulfates, or double sulfates are preferred, especially when they contain considerable water of hydration. For best results, these materials are used with a suitable cooperating ingredient, such as a weakly acidic substance or a material such as $P_2O_5$ or $PCl_5$, which with water form weak acids. Aluminum acid sulfate, when properly used with a cooperating material of the character of oxalic or phosphoric acids, produces rubber reaction products having exceptionally desirable properties for use as a base for paints.

Examples of the acid sulfates or double sulfates which are particularly desirable for use are those of aluminum, iron (both ferric and ferrous), the alkali metals including ammonia, alkaline earth metals, and the closely related alums, potassium alum and other alums. In addition to the acid sulfates, certain sulfates may be used advantageously. Examples of these are sulfates of aluminum, iron (both ferric and ferrous), copper, mercury and cadmium. Examples of salts of strong acids other than sulphuric acid are bromides of mercury and zinc, chlorides of mercury, tin and aluminum, and alkali metal iodides.

Oxalic acid is preferred as the weakly acidic ingredient of the conversion reagent for use in forming the rubber conversion products hereinbefore mentioned. Other weak acids that are also desirable for use are benzoic, phosphoric, tartaric, phthalic and salicylic. The particular acid may be selected for the properties it gives to the conversion product, as various acids seem to impart slightly different properties. These weakly acidic materials, while assisting in the formation of the rubber derivatives, are not absolutely essential ingredients of the conversion reagents, and may in some cases be omitted. The quantity of salts of strong acids required to convert the rubber into the derivative is, however, much larger when the weakly acidic compound is omitted as a part of the conversion reagent. Thus, the rubber derivative may be prepared by using aluminum acid sulfate alone as the conversion reagent, but its properties are improved and the quantity of reagents required is decreased when oxalic acid or other weak acid is also present.

In the preparation of the conversion products, the conversion reagent is milled or otherwise suitably mixed with the rubber until it is thoroughly incorporated. It has been found that the amount and the conditions of mechanical working or mastication have a marked influence on the character of the conversion product produced. Mastication in the presence of an acid, such as sulphuric, sulfurous, sulfonic, etc., has a tendency to lower abrasion and weathering resistance of the film. Conversion reagents of a solid nature are preferred, both because they may be quickly incorporated with a minimum of milling and the mastication of the rubber in the presence of such ingredients is less harmful to the character of the conversion product.

Preferably, there should be present in the mix from 1.5% to 15% of water, including any water of crystallization that may be present. The amount of water may vary outside of and beyond these limits for the production of materials with desired specific properties, but usually in the production of rubber derivatives for coatings 3% to about 9% or 10% of water should be present in the mix. Ordinarily, some free water is added during the mixing to bring the total quantity within this value.

The temperature and time of heating greatly affect the character of the product. The temperature in the sheets should not rise substantially higher than about 170° C., and superior products are obtained when the temperature remains considerably below this value. Preferably, the oven temperature should be between about 130° C. to 155° C. The control of temperature in the material is aided by the use of thin sheets having a thickness of about 2 or 3 mm., or even less. Also, the evaporation of the water contained in the sheets serves to keep the temperature down. If desired, air or an inert gas may be circulated over the sheeted material in the oven.

It is preferred, however, to heat the mix in an atmosphere having less oxygen pressure than the partial pressure of oxygen in air, such as is obtained with an inert gas or in a vacuum. Ordinarily, a relatively high vacuum, such as about 500 mm. or more, of mercury is preferred. By carrying out the reaction in a vacuum or an inert gas, the tendency for portions of the thin sheets to become harder than others is substantially eliminated, and a more uniform product is obtained.

The formation of the mix into relatively thin sheets, such as sheets having a thickness of 1 mm. to 6 or 7 mm., and preferably 2 to 3 mm. or so, is beneficial regardless of the conversion reagent used, and is also important in facilitating the reaction, it being found that the reaction takes place with difficulty in the interior of the sheet and a non-uniform product is attained when relatively thick sheets are used. When sheets such as those 8 mm. to 10 mm. or more in thickness are used, an undesirable product for the making of paints is obtained.

The use of conversion reagents which are solid, or volatilize with difficulty, is advantageous in carrying out the reaction when the material is in the form of thin sheets. When readily volatile reagents are used and the mix is sheeted into thin sheets, sufficient of the reagent or reagents may be volatilized so that the reaction is incomplete even in the middle of the sheet.

The sheeted material is heated for a sufficient time to allow the reaction to progress to the desired stage. A somewhat harder product is produced by increasing the quantity of conversion reagent, or by heating a given mixture for a longer period of time. After heating, the material is substantially insoluble in rubber solvents, but solubility may be restored by masticating the material for a sufficient time on a rubber mill or in a suitable mixer.

The quantity of conversion reagent used in forming the rubber conversion product is dependent on the character of the conversion product desired and the particular conversion reagent used. Larger quantities of a conversion reagent, such as aluminum acid sulfate and phosphoric acid, when heated for a given length of time give harder products. When a weakly acidic compound is not present, a larger quantity of the acid salt of a strong acid must be used to produce conversion products of the same hardness. This may amount to 50% or more of the rubber mixture. When a weak acid such as phosphoric is also present, the total of both ingredients of the conversion reagent may in some cases be less than 10% of the rubber mixture.

The characteristics of the derivatives produced are also somewhat dependent on the rubber used as a starting material, and the strongest films are produced from crude rubber, such as pale crepe, smoked sheet, etc. Masticated rubber may, however, be also used as a basis for preparation of the derivative for paints. Other rubberlike materials, such as reclaim rubber and African or Congo rubber, may be used for the production of rubber derivatives of the type herein disclosed, but are not as desirable as crude Hevea rubber.

The character of the final product or base for coating compositions also depends somewhat upon the amount of mastication of the material after the reaction. The toughest and most resistant film is produced from coating compositions having a base wherein the amount of mastication has been reduced to the minimum for the requisite solubility. Mastication of the reaction product, however, is required in order to obtain the desired solubility for paints with good body.

It is desirable that paint bases have substantially all of the residual conversion agent products, particularly those with an acid reaction, removed. The acids may be neutralized by the addition of alkaline substances, or preferably they may be removed by washing. The washing and mastication of the product may take place simultaneously. Thus, it has been found that sufficient solubility and a desirable paint base is obtained by masticating the reaction products on a rubber mill or rubber washer under a stream of water until the washings no longer turn blue litmus red.

While a very desirable paint base may be prepared as above described without the addition of further materials, it has been found that the characteristics of the base may be much improved when one incorporates therein one or more of a group of additional materials, including glycerine, rosin, elements such as sulfur, selenium, tellurium, etc., which effect vulcanization of rubber, and accelerators, such as Captax (mercaptobenzothiazole) and Tuads (tetramethyl-thiuram-disulphide).

It has been found that selenium is particularly desirable in the rubber derivatives used as a base for coating compositions. The derivatives containing combined selenium are more soluble, the paint films are more flexible and have much better aging properties. The selenium may be chemically combined with the rubber derivative by again heating it after the reaction, but is preferably incorporated into the rubber before the reaction and approximately simultaneously with the conversion reagent so that combination will occur during the heating of the mixture and during the exothermal reaction above described. The solubility of the product is increased with an increase in the percentage of selenium, but sufficient solubility is usually obtained with less than 3% or 4% of selenium, based on the original rubber content of the mix. The preferred amount of selenium is usually between about 0.1% and about 2%.

The selenium, however, like drying oils, plasticizers and glycerol, increases the thermoplasticity of the paint base, and to counteract these effects it is usually desirable to incorporate a small quantity of sulfur in the material. Sulfur decreases the thermoplasticity of the material and improves the color of the product, but also decreases the solubility, and for the latter reason should be added in relatively small quantities, such as 1% or even less. By balancing the quantities of sulfur and selenium, one may vary the solubility and plasticity of the paint base almost as desired, but the quantity of sulfur is preferably less than 3% even when selenium is used. The sulfur like the selenium may be incorporated in the material, as by milling, before or after the reaction, but if added after the formation of the derivative the mix must be again heated or otherwise suitably treated to effect chemical combination of the sulfur. Tellurium may be added to the paint base either in place of or in addition to the sulfur and/or selenium. Tellurium, if used, may be in amounts equivalent to the selenium.

Polyhydric alcohols, and especially glycerine, when added to the reaction mix prior to the reaction, act to improve the gloss of the finished paint or composition and also act to further improve the solubility of the paint base. They may be added either alone or in combination with sulfur, selenium, and/or rosin, etc. Other resins, such as cumar and ester gum, may be incorporated in the paint base and have the property of improving the gloss. Rosin is effective in increasing the solubility of the composition and may be incorporated with or without the other added ingredients above. However, if a considerable amount of glycerine is added to the mixture when a substantial quantity of rosin is used, some of the glycerine may react with the rosin to form ester gum.

The base prepared as above described with or without the added ingredients may be dissolved in any suitable rubber solvents, such as the petroleum solvents for rubber, and combined with suitable pigments or coloring materials, drying oils, plasticizers, and fillers in accordance with usual practice to produce coating compositions having excellent properties. They are relatively resistant to alkalies, acids, heat, weathering and abrasion, and have relatively low viscosity for the quantity of base material present. If drying oils and/or driers are incorporated in the paint, it has been found that the dried film possesses increased resistance to rubber solvents, such as gasoline, etc.

The addition of many of the usual rubber accelerators, such as Captax and Tuads, also has the effect of increasing the thermoplasticity and the solubility of the paint base and, therefore, increase the body of the paint. They also have the property of making the paint more resistant to oxidation. When accelerators are used for this purpose it is preferable to add them after the rubber conversion product is formed and they may be added in the milling or in solution.

If it be desirable to apply a thick coat of paint in one brushing, the body of the paint may be increased by increasing the quantity of non-volatiles in the paint, which may be accomplished by the addition of drying oils, with or without driers, and by the addition of plasticizers. Plasticizers may be added to the paint to increase the flexibility of the film and improve the gloss. Rubber plasticizers or softeners, such as pine tar, abalyn (methyl esters of abietic acid), and other esters of relatively high boiling point, may be used in suitable amounts from a small percent such as 5% or so up to 20% or more.

Although the rubber derivatives of this invention may be classed as cyclo rubbers having substantially the same carbon and hydrogen ratio as rubber, it has been found that solutions of decreased viscosity are produced when a small amount of a rubber precipitant or viscosity depressant, such as butyl alcohol, acetone, etc., is added to the rubber solvent or to the solution of the conversion product. Even though the rubber may be in a cyclic condition, the depressant apparently causes a diminution in the radius of action of the molecules in the solvent, resulting in lower viscosity and permitting a paint with good body to be made.

Suitable viscosity depressants are the lower alcohols, aldehydes, ketones, lower esters, lower fatty acids, nitro compounds, chlorhydrins, nitriles, etc. They are substantially non-solvents or weak solvents for rubber, but are soluble or miscible with rubber solvents. These materials should not be combined with the rubber solvent in sufficiently large quantities to cause precipitation of the rubber derivative from the final solution, however.

It has been found that pigments may be added to the base material in larger quantity when an oil, such as linseed or tung oils, or a rubber softener is added to the reaction product during the mastication or solubilization on the rubber mill or equivalent masticating apparatus. The pigments and filling materials are preferably masticated into the rubber on a rubber mill, but they may be added to the solution of the base.

Certain pigments, such as zinc oxide, carbon black, magnesium oxide, magnesium carbonate, and other basic rubber reinforcing materials, appear to reduce the plasticity of paint bases prepared as above. The pigments used are the same as those used in oil paints, although larger amounts of the so-called reactive pigments, such as zinc oxide, may be used since the Reanite resin is free from acidity when prepared by the methods described above.

The following examples illustrate the invention:

*Example 1*

| | Parts |
|---|---|
| Rubber (pale crepe) | 960 |
| Oxalic acid (hydrated) | 105 |
| Aluminum acid sulfate | 230 |

The aluminum acid sulfate in master batch form and the oxalic acid were incorporated into the rubber on a rubber mill, and the mixture sheeted into sheets about 5 mm. or less in thickness. These relatively thin sheets were then heated in a vacuum oven for three hours at 150° C., allowed to cool, masticated and simultaneously washed until the washings no longer turned blue litmus red.

During the mastication, pigments and powders desirable for the particular compositions were incorporated into the base to give a uniform dispersion when dissolved. For most uses it is preferable to add barium carbonate directly to the paint base in order to neutralize acids. This material also improves the properties of the coating composition.

A suitable quantity of a plasticizer, such as the pale liquid resin sold under the trade name of "Abalyn" by the Hercules Powder Company, diamyl naphthalene, polyamylnaphthalene, etc., and drying oils, such as tung oil, linseed oil, etc., were also added on the mill.

A quantity of this paint base equivalent to 100 parts of resinous material was then dissolved in 350 parts of mineral spirits, containing 11 parts of butyl alcohol, plus some additional drying oil, metallic driers, such as metallic resinates, etc. The coating composition thus produced had a desirable body, very rapid drying characteristics, great resistance to alkali and most other chemicals, and spread readily to produce a smooth film with the absence of brush marks. If the amount of drying oil used is not too great, there is an absence of skinning in the can.

*Example 2*

Approximately 1% of sulfur and 2% of selenium were incorporated with the ingredients of Example 1 prior to sheeting the mixture into relatively thin sheets and heating to procure the reaction. The paints formed from the reaction product had after washing a lighter color and were more soluble. After the washing, barium carbonate and other pigments were added on the mill and the product dissolved in rubber solvents.

When a small percentage of glycerine and some rosin was incorporated into the product, a product having higher gloss, and which had excellent characteristics as a baking enamel was produced.

The coating compositions prepared from the bases above have good body, and films produced therefrom have a high degree of water resistance and are relatively resistant to the effects of light, etc. Their resistance to light is improved, however, by incorporating drying oils, such as tung or linseed oil, or by mixing solutions of the above bases with varnishes having certain synthetic resins, such as the phenol formaldehyde resins, etc., as a substantial constituent.

The flexing point of the paint base resin, prepared as described above, may be readily determined by placing thin sheets approximately ¼ inch in thickness in cold water and then heating the water gradually. The temperature at which the resin can be slowly bent back upon itself may be termed the "flexing point." Even at this point the resin when struck a sharp blow or bent rapidly is likely to fracture. For most paints it is desirable to have the flexing point of the resin in the range between 70° C. and 90° C., although it will be seen that the temperature range may be somewhat lower or higher depending upon the type of coating desired.

The bases of the coating compositions of this invention are members of the group consisting of rubber derivatives having the general formulae $(C_5H_8)_x$ and $(C_5H_8)_xA_yB_zD_u$, where $x$, $y$, $z$ and $u$ are variable numerical values, and A, B and D are the same members or different members of the group consisting of elements known to vulcanize rubber. Less general formulae of the preferred compounds are $(C_5H_8)_x$, $(C_5H_8)_xS_y$, $(C_5H_8)_xSe_z$ and $(C_5H_8)_xS_ySe_z$, where $x$, $y$ and $z$ are variable numerical values. The derivatives in their preferred form may further be characterized by having properties of rubber derivatives prepared by heating a thinly sheeted mixture of rubber, a solid rubber conversion reagent, with or without one or more members of the group consisting of tellurium, selenium and sulfur, to obtain a reaction product, and then masticating the product to render it soluble in petroleum solvents. As evidenced by iodine values, these compounds have greater chemical saturation than rubber with an equivalent molecular quantity of elements other than carbon and hydrogen combined therewith.

The present application is a continuation-in-part of my prior application, Serial No. 292,699, filed August 30, 1939.

Although several embodiments of the invention have been herein shown and described, it will be understood that numerous modifications of the process shown may be resorted to without departing from the spirit of this invention as defined in the appended claims.

What I claim is:

1. A pigmented coating composition for protecting and decorating surfaces having as an essential constituent a solution of the unmelted, masticated heat reaction product of a relatively thinly sheeted mix of rubber and a rubber conversion reagent capable of causing the condensation of rubber when heated with rubber, and comprising a solid salt of a strong acid and water of crystallization, said reaction product having the same carbon and hydrogen ratio as rubber and having more chemical saturation than rubber with an equivalent quantity of elements other than carbon and hydrogen combined therewith, the masticated reaction product being soluble in petroleum solvents for rubber.

2. A pigmented coating composition for protecting and decorating surfaces having as an essential constituent a solution of the masticated unmelted heat reaction product of a mix formed so as to have a section not substantially greater than about 7 mm. during the heating period, and comprising rubber, a rubber vulcanizing agent, and a solid rubber conversion reagent, comprising the salt of a strong acid and a weakly acidic substance, and capable of causing the condensation of rubber when heated therewith in a form having thin section, said reaction product having the same carbon and hydrogen ratio as rubber and having more chemical saturation than rubber with an equivalent quantity of elements other than carbon and hydrogen combined therewith, the masticated reaction product being soluble in petroleum solvents for rubber.

3. A pigmented coating composition for protecting and decorating surfaces having as an essential constituent a solution of the unmelted, masticated heat reaction product of a mix formed to a thickness of not substantially more than 7 mm., and comprising unvulcanized rubber, selenium, a finely divided solid rubber conversion reagent having a salt of a strong acid, and a substance which in water is a weak acid, as constituents, and being capable of causing the condensation of rubber when heated therewith in a form having thin section, said reaction product having the same carbon and hydrogen ratio as rubber and having more chemical saturation than rubber with an equivalent quantity of elements other than carbon and hydrogen combined therewith, the masticated reaction product being soluble in petroleum solvents for rubber.

4. A protective coating composition having as an essential constituent a solution of the unmelted, masticated, soluble heat reaction product of a relatively thinly sheeted mix, comprising rubber, an acid sulfate, and a member of the group consisting of weak acids and substances which in water are weak acids, said reaction product having the same carbon and hydrogen ratio as rubber and having more chemical saturation than rubber with an equivalent quantity of elements other than carbon and hydrogen combined therewith, the masticated reaction product being soluble in petroleum solvents for rubber.

5. A protective coating composition having as an essential constituent a solution of the masticated heat reaction product of a mix formed to a section having a thickness of less than 7 mm., and comprising rubber, an acid sulfate, selenium, and a substance which in water is a weak acid, said reaction product having the same carbon and hydrogen ratio as rubber and having more chemical saturation than rubber with an equivalent quantity of elements other than carbon and hydrogen combined therewith, the masticated reaction product being soluble in petroleum solvents for rubber.

6. A protective coating composition having as a substantial constituent a solution of the homogeneous heat reaction product of a mix, comprising rubber, a salt of a strong acid, a weakly acidic substance, and selenium, said reaction product having the same carbon and hydrogen ratio as rubber and having more chemical saturation than rubber with an equivalent quantity of elements other than carbon and hydrogen combined therewith, the masticated reaction product being soluble in petroleum solvents for rubber.

7. A protective coating composition having as a substantial constituent a solution of the homogeneous heat reaction product of a mix formed in a thin section, and comprising rubber, aluminum acid sulfate and oxalic acid.

8. A protective coating composition having as a substantial constituent a solution of the homogeneous heat reaction product of a mix, comprising rubber, aluminum acid sulfate, selenium and oxalic acid.

9. A protective composition having as an essential constituent a rubber derivative selected from the group of soluble, masticated, unmelted rubber derivatives having unit formulae C₅H₃ and C₅H₈ chemically combined with at least one member of the group consisting of sulfur, selenium and tellurium, said unit formulae having less unsaturation than rubber and addition products of rubber having the same percentage composition, said rubber derivative being soluble in petroleum solvents for rubber and being one prepared by heating thin sheets, not substantially thicker than 7 mm., of a mixture of rubber with a solid rubber conversion reagent in an atmosphere having less oxygen pressure than the partial pressure of oxygen in the atmosphere, and masticating the reaction product.

10. A protective coating composition having as an essential constituent a soluble, masticated, unmelted rubber derivative selected from the group of rubber derivatives having unit formulae C₅H₃ and C₅H₈ chemically combined with at least one member of the group consisting of sulfur, selenium and tellurium, said unit formulae having less unsaturation than rubber and addition products of rubber having the same percentage composition, said rubber derivative being soluble in petroleum solvents for rubber and being one prepared by heating thin sheets of a mixture of rubber with a solid rubber conversion reagent, comprising a salt of a strong acid, water and a substance which in water is a weak acid, in an atmosphere having less oxygen pressure than the partial pressure of oxygen in the atmosphere, and masticating the reaction product.

11. A protective coating composition having as an essential constituent a soluble, unmelted, masticated rubber derivative selected from the group of rubber derivatives having unit formulae C₅H₃ and C₅H₈ chemically combined with at least one member of the group consisting of sulfur, selenium and tellurium, said unit formulae having less unsaturation than rubber and addition products of rubber having the same percentage composition, said rubber derivative being soluble in petroleum solvents for rubber and being one prepared by heating thin sheets of a mixture of rubber with a solid conversion reagent for rubber, containing water of crystallization, in an atmosphere having less oxygen pressure than the partial pressure of oxygen in the atmosphere, and masticating the reaction product.

12. A method for preparing a base for coating compositions, comprising forming a mix, comprising rubber, a salt of a strong acid, a weakly acidic substance, and selenium, heating the mix without melting to procure a reaction, and mechanically working the product to solubilize it.

13. A method for preparing a base for coating compositions, comprising forming a mix, comprising rubber, a salt of a strong acid, a weakly acidic substance, sulfur, and selenium, heating the mix to procure a reaction, and mechanically working the product to render it soluble.

14. A pigmented paint composition having as a basic constituent a solution of the masticated, unmelted heat reaction product of a thinly formed mix having a section not substantially greater than 7 mm., and comprising rubber, a rubber vulcanizing agent, and a solid rubber conversion reagent comprising the salt of a strong acid, water, and a substance which in water is a weak acid, and capable of causing the condensation of rubber when heated therewith in a form having a section about 2 or 3 mm. in thickness, said reaction product being soluble in petroleum solvents for rubber, having the same carbon and hydrogen ratio as rubber, and having more chemical saturation than rubber, with an equivalent quantity of elements other than carbon and hydrogen combined therewith.

15. A pigmented paint composition having as a basic constituent a solution of the heat reaction product of a thinly formed solid mix essentially of rubber and a rubber conversion reagent capable of causing the condensation of rubber when heated with rubber, said conversion reagent comprising an acid salt of a strong acid and water, and said reaction product being soluble in petroleum solvents for rubber, having the same carbon and hydrogen ratio as the rubber and having more chemical saturation than rubber with an equivalent quantity of elements other than carbon and hydrogen combined therewith.

16. A pigmented paint composition having as a basic constituent a solution of the heat reaction product of a thinly formed mix essentially of rubber and a rubber conversion reagent capable of causing the condensation of rubber when heated with rubber, and containing a salt of a strong acid, water, including water crystallization, and a substance which in water is a weak acid, and said reaction product being soluble in petroleum solvents for rubber, having the same carbon and hydrogen ratio as the rubber and having more chemical saturation than rubber with an equivalent quantity of elements other than carbon and hydrogen combined therewith.

17. A soluble base for coating compositions comprising an unmelted, masticated rubber derivative containing selenium in chemically combined form, said derivative being further characterized by having the same carbon to hydrogen ratio as does rubber, by consisting of carbon, hydrogen and at least one vulcanizing element for rubber selected from the group consisting of sulfur, selenium and tellurium, and by having less chemical unsaturation than does rubber with a chemical equivalent quantity of added elements combined with the carbon and hydrogen, said base being soluble in petroleum solvents for rubber, and being the exothermal solid heat reaction product of a rubber mix containing a rubber conversion reagent.

18. A coating composition containing a polyhydric alcohol and having as a basic constituent a masticated, unmelted rubber derivative which is soluble in petroleum solvents for rubber, which consists essentially of carbon, hydrogen and at least one vulcanizing agent selected from the group consisting of sulfur, selenium and tellurium, all in chemical combination, and which contains selenium in combined form, said basic constituent being further characterized by being the exothermal solid heat reaction product of a rubber mix containing a rubber conversion reagent, by having the same carbon to hydrogen ratio as rubber, and by having less chemical unsaturation than rubber addition products of the same percentage composition.

19. A coating composition in paint form comprising a dispersion in petroleum solvents for rubber of a masticated, unmelted heat reaction product of a thinly sectioned mix of solid rubber, selenium, a salt of a strong acid and water.

20. A coating composition in paint form comprising a dispersion in petroleum solvents for rubber of a masticated, unmelted heat reaction product of a thinly sectioned mix of solid rubber, a member of the group consisting of sulfur, selenium and tellurium, a salt of a strong acid and water.

21. A coating composition in paint form comprising a dispersion in petroleum solvents for rubber of a masticated, unmelted heat reaction product of a thinly sectioned mix of solid rubber, a member of the group consisting of sulfur, selenium and tellurium, a salt of a strong acid and water, said coating composition also containing glycerine and rosin.

22. A coating composition in paint form comprising a dispersion in petroleum solvents for rubber of a masticated, unmelted heat reaction product of a thinly sectioned mix of solid rubber, a member of the group consisting of sulfur, selenium and tellurium, a salt of a strong acid and water, said coating composition also containing butyl alcohol, glycerine and rosin.

23. A protective coating composition having as a substantial constituent thereof a solution of a rubber derivative consisting of carbon, hydrogen and selenium in chemical combination, said rubber derivative being the heat reaction product of a rubber mix containing a conversion reagent for rubber, being soluble in petroleum solvents for rubber, and being further characterized by having the same carbon-to-hydrogen ratio as rubber and by having less chemical unsaturation than have simple rubber addition products of the same percentage composition.

24. A protective coating composition having as a substantial constituent thereof a solution of a rubber derivative consisting of carbon, hydrogen, sulfur and selenium in chemical combination, said rubber derivative being further characterized by being a solid exothermic heat reaction product of a rubber mix containing a conversion reagent for rubber, by being soluble in petroleum solvents for rubber, by having the same carbon-to-hydrogen ratio as rubber and by having less chemical unsaturation than have simple rubber addition products of the same percentage composition.

THOMAS RAYMOND GRIFFITH.